(12) United States Patent
Scheerer et al.

(10) Patent No.: US 10,662,994 B2
(45) Date of Patent: May 26, 2020

(54) SELF-DRILLING, SELF-COUNTERSINKING FASTENER

(71) Applicant: SFS intec Holding AG, Heerbrugg (CH)

(72) Inventors: Daniel Scheerer, Sinking Spring, PA (US); James Cole, Lancaster, PA (US)

(73) Assignee: SFS intec Holding AG, Heerbrugg (CH)

( * ) Notice: Subject to any disclaimer, the term of this patent is extended or adjusted under 35 U.S.C. 154(b) by 161 days.

(21) Appl. No.: 15/710,057

(22) Filed: Sep. 20, 2017

(65) Prior Publication Data

US 2018/0080491 A1    Mar. 22, 2018

Related U.S. Application Data

(60) Provisional application No. 62/398,143, filed on Sep. 22, 2016.

(51) Int. Cl.
| | | |
|---|---|---|
| *F16B 35/06* | (2006.01) | |
| *F16B 25/10* | (2006.01) | |
| *F16B 25/00* | (2006.01) | |

(52) U.S. Cl.
CPC ........ *F16B 35/065* (2013.01); *F16B 25/0021* (2013.01); *F16B 25/0031* (2013.01); *F16B 25/103* (2013.01); *F16B 25/106* (2013.01)

(58) Field of Classification Search
CPC .................................................. F16B 35/065
USPC ........................................................ 411/399
See application file for complete search history.

(56) References Cited

U.S. PATENT DOCUMENTS

| | | | | |
|---|---|---|---|---|
| 465,101 | A | * 12/1891 | Richards | ................. F16B 35/06 411/399 |
| 5,199,839 | A | * 4/1993 | DeHaitre | ............ F16B 23/0076 411/387.3 |
| 5,205,694 | A | * 4/1993 | Nagoshi | ............... F16B 23/0023 411/399 |
| 6,290,444 | B1 | * 9/2001 | Dicke | .................... F16B 35/065 411/188 |
| D708,509 | S |  7/2014 | Lin | |
| D708,510 | S |  7/2014 | Lin | |
| 10,054,148 | B2 | * 8/2018 | Lin | ........................ F16B 35/065 |
| 2008/0273941 | A1 | 11/2008 | Van Cor | |
| 2009/0123253 | A1 |  5/2009 | Hettich | |
| 2014/0178149 | A1 |  6/2014 | Su et al. | |

(Continued)

FOREIGN PATENT DOCUMENTS

JP    52164667    12/1977

*Primary Examiner* — Flemming Saether
(74) *Attorney, Agent, or Firm* — Volpe and Koenig, PC.

(57) ABSTRACT

A self-drilling, self-countersinking fastener is provided that includes a shaft, a countersunk head located at a first end of the shaft, and a tapered point located at an opposite end of the shaft. A thread integrally extends from the shaft and extends along at least a portion of a length thereof. The countersunk head includes a frustoconical region having a first, smaller diameter in a shaft connection region and a second, larger diameter at a second end defining an edge area of the head. A plurality of radially extending ribs are located on the frustoconical region and extend from an area of the first, smaller diameter to a respective radially outer rib end spaced radially inwardly by a distance X from the edge area of the head. A respective cutting edge is located on each of the ribs.

13 Claims, 3 Drawing Sheets

(56) References Cited

U.S. PATENT DOCUMENTS

2015/0063947 A1     3/2015   Huang  
2016/0245327 A1     8/2016   Hughes  
2018/0245620 A1*   8/2018   Huang .................. F16B 35/065

* cited by examiner

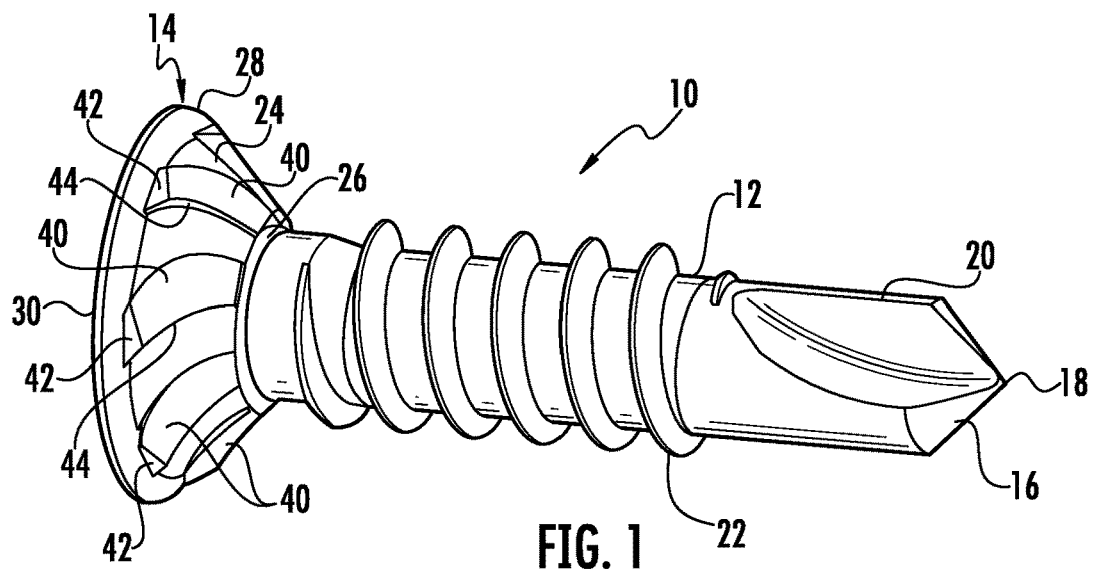
FIG. 1
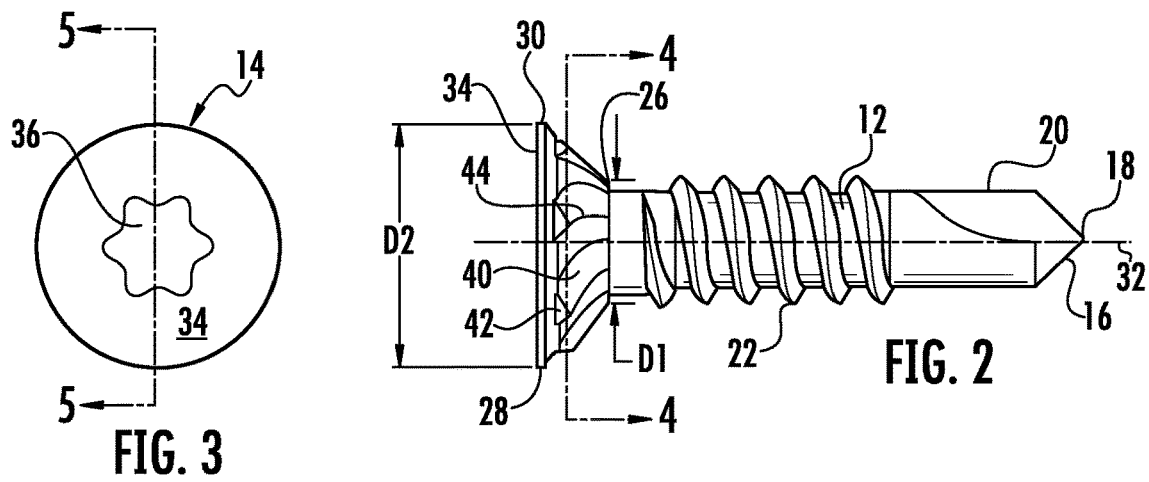
FIG. 3
FIG. 2
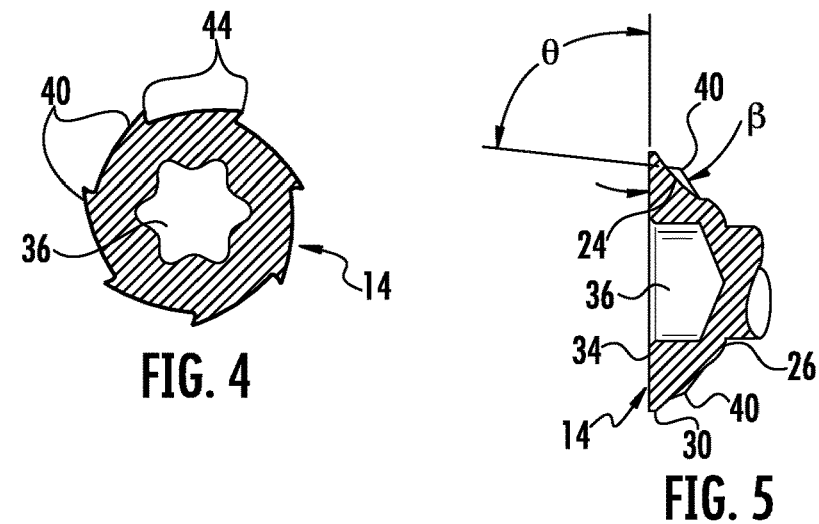
FIG. 4
FIG. 5

SELF-DRILLING, SELF-COUNTERSINKING FASTENER

INCORPORATION BY REFERENCE

The following documents are incorporated herein by reference as if fully set forth: U.S. Provisional Patent Application No. 62/398,143, filed Sep. 22, 2016.

BACKGROUND

Fasteners, particularly screw type fasteners drive through and/or into two objects, securing them to one another. In certain applications, it is sometimes necessary to use fasteners with counter-sunk heads for clearances or aesthetics. Typically, holes for such fasteners need to have a countersunk opening drilled to accommodate the countersunk head, and various countersinking tools are known to separately countersinking the opening or to simultaneously countersink the opening as the hole is drilled. One issue here is that an extra countersinking step is required to install otherwise self-drilling screws.

Fasteners with a countersunk head that include a radially extending cutting edge that extends to the circumferential edge of the screw head to countersink the surface as the screw is installed are also known. These may be used successfully in certain applications, such as in wood or laminate surfaces; however, attempting to use such self-countersinking heads in a sheet metal surface or a sandwich panel with a sheet metal skin has not proven successful due to the creation of burrs that are not only sharp and dangerous, but may compromise the integrity of the screw attachment and the sheet metal itself. Additionally, there can be overcutting of the countersink, resulting in a knife edge of the sheet metal acting on the shaft rather than a more desired cylindrical portion of the hole. Finally, the cutting edge can severally mar the panel surface at the periphery of the head.

It would be desirable to provide a self-drilling, self-countersinking screw that addresses the issues noted above.

SUMMARY

A self-drilling, self-countersinking fastener is provided in order to address one or more of the drawbacks noted above. This fastener includes a shaft, a countersunk head located at a first end of the shaft, and a tapered point located at an opposite end of the shaft. A thread integrally extends from the shaft and extends along at least a portion of a length of the shaft. The countersunk head includes a frustoconical region having a first, smaller diameter in a shaft connection region and a second, larger diameter at a second end defining an edge area of the head, a plurality of radially extending ribs located on the frustoconical region that extend from an area of the first, smaller diameter to a respective radially outer rib end spaced radially inwardly by a distance X from the edge area of the head. A respective cutting edge is located on each of the ribs.

Preferably, each of the ribs has a maximum height from the frustoconical region, and the distance X is greater than or equal to one half of the maximum height. This maximum height of each of the ribs is preferably located at the radially outer rib end. However, it could also be located further inwardly, depending on the particular application.

In one preferred arrangement, the shaft has an axis, and the radially outer rib end extends generally parallel to the axis. Preferably, the countersunk head has an end surface that extends perpendicular to the axis, and the outer rib end extends at an angle of 45° to 90° to the end surface, so that it tapers radially inwardly progressing toward the tapered point of the fastener.

In one preferred arrangement, the ribs are helical. The helical ribs preferably have a reverse taper at the rib end. Preferably, an angle of attack of the cutting edge changes along a length of the ribs as they extend radially outwardly from an area of the first, smaller diameter in the shaft connection region.

The helical ribs are preferably curved as they extend radially outwardly in an advancing direction of the fastener based on a direction of the thread. In order to achieve optimum cutting, preferably there are an odd number of ribs.

In an alternative arrangement, the ribs are straight.

In both cases, the ribs may change in height along a length thereof. In one preferred arrangement, the ribs extend from a minimum height Hi in an area of the first, smaller diameter in the shaft connection region to a maximum height $H_M$ at the radially outer rib end.

Preferably, the fastener is self-drilling and includes a hole cutting edge on the tapered point. Preferably, the cutting edge is adapted for drilling a hole in steel or aluminum.

In another embodiment, the frustoconical region has a first, inner area and a second, outer area that is radially outward of the first, inner area, and the cutting edges of the ribs have a different angle of attack in the first, inner area from the second, outer area.

For all of the arrangements contemplated, a tool engagement recess is located in the head, and can be, for example, a cross-slot, a Phillips® or Torx® drive, or any other suitable tool engagement recess.

BRIEF DESCRIPTION OF THE DRAWING(S)

The foregoing summary as well as the following detailed description will be best understood when read in conjunction with the appended drawings. In the drawings:

FIG. 1 is a perspective view of a self-drilling, self-countersinking fastener according to a first embodiment.

FIG. 2 is a side view of the self-drilling, self-countersinking fastener shown in FIG. 1.

FIG. 3 is an end view showing the head of the self-drilling, self-countersinking fastener of FIG. 1.

FIG. 4 is a cross-sectional view through the countersunk head of the fastener taken along line 4-4 in FIG. 2.

FIG. 5 is a cross-sectional view taken along line 5-5 in FIG. 3.

DETAILED DESCRIPTION OF THE PREFERRED EMBODIMENTS

Figure 6:
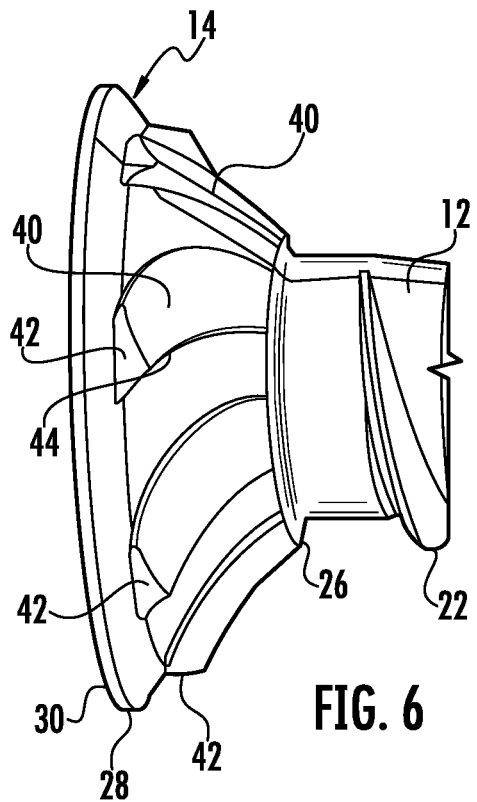
FIG. 6 is a greatly enlarged portion showing the countersunk head of FIG. 1.

Certain terminology is used in the following description for convenience only and is not limiting. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Referring to FIGS. 1-8, a first embodiment of a self-drilling, self-countersinking fastener 10 is shown in detail. The self-drilling, self-countersinking fastener 10 includes a shaft 12 with a countersunk head 14 located at a first end 16 of the shaft 12 and a tapered point 18 located at an opposite end of the shaft 12. Preferably, a hole-cutting edge 20 is provided at or along the tapered point 18 in order to form the self-drilling portion of the fastener 10. Additionally, preferably a tool engagement recess 36, such as illustrated in FIGS. 3-5, is located in the head 14. This can be, for example, a cross recess, a slot, a TORX®, a Phillips®, or any other suitable type of drive. A thread 22 integrally extends from the shaft 12 and extends along at least a portion of a length of the fastener 10.

In order to address the issues in the known prior art countersunk heads to minimize the creation of burrs or sharp or dangerous edges, improve the final surface appearance, and reduce any chatter marks in the component being joined in which the head is countersunk, the countersunk head 14 includes a frustoconical region 24 on the underside having a first, smaller diameter $D_1$ in a shaft connection region 26 and a second, larger diameter $D_2$ at a second end 28 defining an edge area 30 of the head 14. The edge area 30 can also have a depth that leads to the end surface 34 of the countersunk head 14 which extends perpendicular to an axis 32 of the fastener. A plurality of radially extending ribs 40 are located on the frustoconical region 24 and extend from an area of the first, smaller diameter $D_1$ to a respective radially outer rib end 42, shown in detail in FIGS. 6-8, that is spaced radially inwardly by a distance X from the edge area 30 of the head. This distance X is indicated as extending along the frustoconical region 24 in FIG. 7. A respective cutting edge 44 is located on each of the ribs 40.

Figure 7:
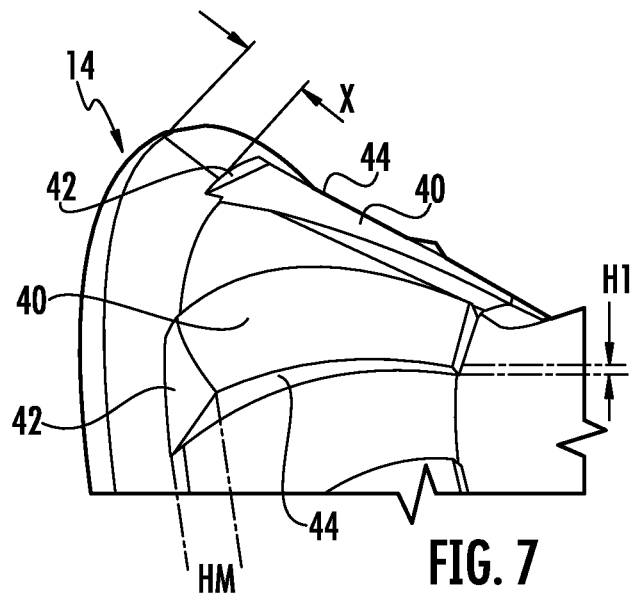
FIG. 7 is a further enlarged portion of the countersunk head showing one preferred rib configuration with the cutting edge.

In the preferred embodiment, each of the ribs 40 has a maximum height $H_m$ from the frustoconical region 24 and the distance X is greater than or equal to one-half of the maximum height $H_m$. As shown in FIG. 7, the maximum height $H_m$ of each of the ribs 40 is preferably located at the radially outer end 42 of the rib. This offset distance X allows for a sufficient cutting of the countersink beneath the head 14 without having burrs or ragged edges extending beyond the peripheral edge of the countersunk head 14 at the edge area 30.

As shown in FIG. 7, the countersunk head 14 preferably includes the end surface 34 that extends perpendicular to the axis 32 of the fastener 10 the radially outer rib end 42 extends generally parallel to the axis 32. More preferably, the outer rib end 42 extends at angle Θ shown in FIG. 5 of 45° to 90° to the end surface 34. More preferably, the angle Θ is in the range of 75° to 85°.

Figure 8:
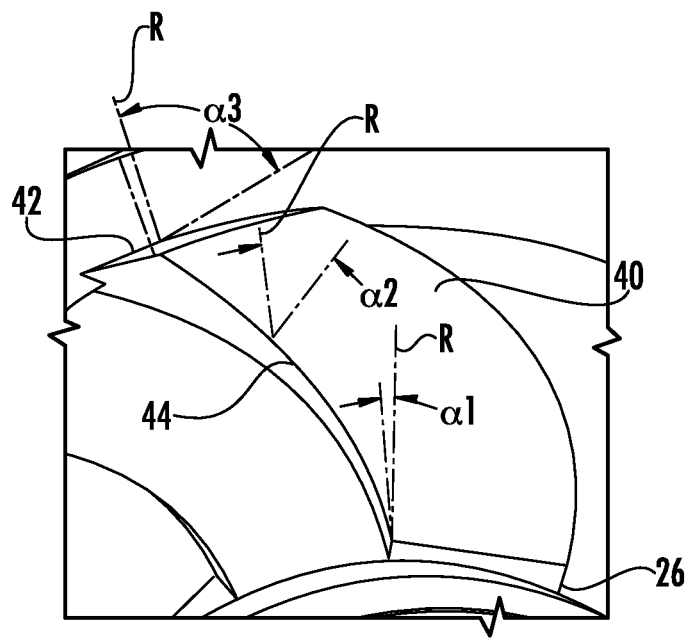
FIG. 8 is an enlarged view of a single helical cutting rib on the countersunk head shown in FIG. 7.

As shown in detail in FIGS. 7 and 8, the ribs 40 in the first embodiment of the fastener 10 are preferably helical. These helical ribs 40 have a reverse taper at the rib end 42. Preferably, this results in an angle of attack of the cutting edge 44 that changes along a length of the ribs 40 as they extend radially outwardly from an area of the first smaller diameter $D_1$ in the shaft connection region 26 to the rib end 42. As shown in FIG. 8, at the shaft connection region 26, the angle of attack α1 is preferably a positive angle of attack at the cutting edge 44 in this area. As the cutting edge 44 extends radially outwardly to a medial region in the area of angle α2, the angle of attack of the cutting edge 44 is becomes negative, as indicated at α2 in that it is tilted away from the direction of advancing rotation of the screw as it is installed. Finally, at the radially outer rib end 42, the angle of attack of the cutting edge 44 is a greater negative angle α3 as shown. In each of these instances, the angle of attack is shown with reference to a line R extending as a normal from the frustoconical region 24 through the cutting edge 44. In the first embodiment of the fastener 10, this frustoconical region 24 is preferably a straight taper.

As can be seen from FIGS. 1 and 2, the fastener 10 has a conventional clockwise thread 22 and the helical ribs 10 are curved as they extend radially outward in an advancing direction of the fastener 10 based on a direction of the thread 22.

In the first embodiment of the fastener 10, preferably there are an odd number of ribs 40. This reduces chatter and enhances the ability to install the screw without chatter. In the preferred embodiment shown in FIGS. 1-8, there are seven ribs, shown in detail in FIG. 4, although this number could be varied depending upon the size of the fastener 10 and the particular application.

Figure 9:
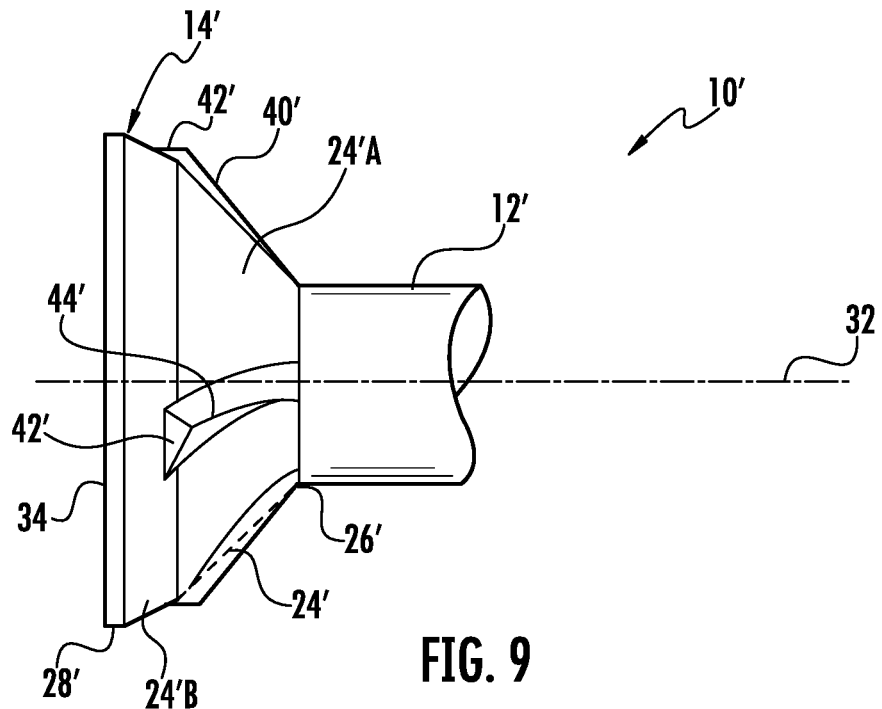
FIG. 9 is a side view of a second embodiment of the fastener in which the frustoconical region of the countersunk head is divided into first and second areas arranged at different angles.

Referring now to FIG. 9, a second embodiment of the fastener 10' is shown. The fastener 10' is similar to the fastener 10 and like elements have been indicated with the same reference number with a prime. In this case, the frustoconical region 24' is formed of a first, inner area 24'A and a second, outer area 24'B that is radially outward of the first inner area 24'a. The cutting edge is 44' of the ribs 40 have a different angle of attack in the first, inner area 24'A from the second outer area 24'B. Preferably, the cutting edge 44' extend at least partially beyond the first, inner area 24'A and into the second, outer area 24'b. The other aspects of the fastener 10' not specifically noted are the same as the first embodiment 10.

Figure 10:
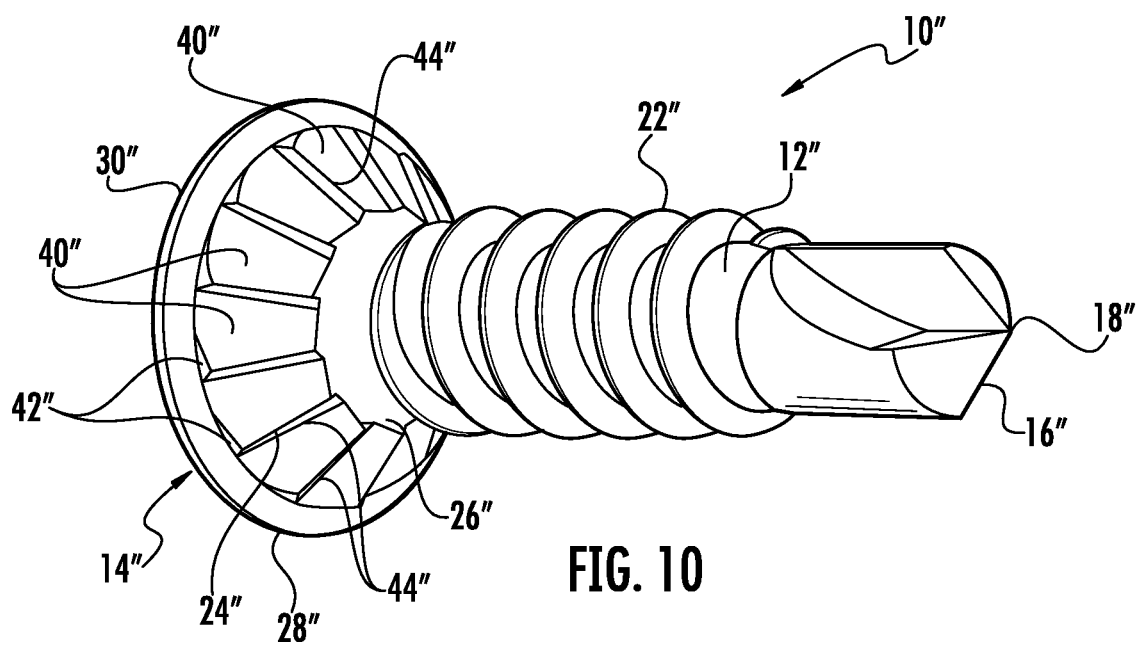
FIG. 10 is a perspective view of a third embodiment of a fastener having straight ribs on the underside of the countersunk head.

Referring now to FIG. 10, a third embodiment of the fastener 10" is shown. The third embodiment of the fastener 10" includes the shaft 12" along with the countersunk head 14" and the first end 16" having a tapered point 18". In this case, the frustoconical region 24" of the countersunk head 14" which extends from the shaft connection region 26" to the second end 28" in order to define the countersinking area includes straight ribs 40" having the respective radially outer rib ends 42" that are spaced radially inwardly by a distance X (which would be the same as shown in FIG. 7, from the outer edge area 30". Here the cutting edges 44" are also formed straight, although the ribs 40" may change in height along a length thereof and the angle of attack of the cutting edge 44" can also change from a more aggressive angle in the shaft connection region 26" to a reverse taper at the radially outer rib ends 42". While this is preferred in some embodiments, those skilled in the art will recognize that the angle of attack of the cutting edge could remain constant with a positive or negative angle of attack, depending upon the particular application for the fastener 10, 10', 10".

Additionally, although the helical ribs 40 of the first embodiment of the fastener 10 are preferably formed for a more aggressive cutting action with the curvature extending in an advancing direction of the fastener based on the direction of the thread 22, a retreating helical rib could also be provided as well.

Using the fasteners 10, 10', and 10" according to the embodiments above, the issues with the prior known countersunk heads are addressed in that a smooth cutting action for the countersink is provided as the fastener 10, 10', 10" is installed. This has specific advantages in connection with sheet metal surfaces or a sandwich panel with a sheet metal skin in that burrs are not created that extend out from underneath the head, and chatter and vibration are reduced allowing for a clean finished look of the installed fastener in the surface into which it was countersunk. Additionally, slight dimpling of a sheet metal surface can also be achieved in a region of the edge area 30 to the extent that it has a height and the frustoconical region 24 does not end directly at the end surface 34 of the head in which the tool engagement recess 36 is provided.

Having thus described various embodiments of the present anti burr fasteners in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A fastener comprising:
    a shaft, a countersunk head located at a first end of the shaft, and a tapered point located at an opposite end of the shaft;
    a thread integrally extending from the shaft and extending along a portion of a length thereof;
    the countersunk head including a frustoconical region having a first, smaller diameter in a shaft connection region and a second, larger diameter at a second end defining an edge area of the head, a plurality of radially extending ribs located on the frustoconical region that extend from an area of the first, smaller diameter to a respective radially outer rib end spaced radially inwardly by a distance X from the edge area of the head, and a respective cutting edge is located on each of the ribs, and the cutting edges each have a positive angle of attack in an area of the shaft connection region and transition to a negative angle of attack at the radially outer rib end.

2. The fastener of claim 1, wherein each of the ribs has a maximum height from the frustoconical region, and the distance X is greater than or equal to one half of the maximum height.

3. The fastener of claim 1, wherein a maximum height of each of the ribs is located at the radially outer rib end.

4. The fastener of claim 1, wherein the shaft has an axis, and the radially outer rib end extends generally parallel to the axis.

5. The fastener of claim 1, wherein the shaft has an axis, the countersunk head has an end surface that extends perpendicular to the axis, and the outer rib end extends at an angle of 45° to 90° to the end surface.

6. The fastener of claim 1, wherein the ribs are helical.

7. The fastener of claim 6, wherein the helical ribs are curved as they extend radially outwardly in an advancing direction of the fastener based on a direction of the thread.

8. The fastener of claim 6, wherein there are an odd number of ribs.

9. The fastener of claim 1, wherein the ribs are straight.

10. The fastener of claim 9, wherein the ribs extend from a minimum height in an area of the first, smaller diameter in the shaft connection region to a maximum height $H_M$ at the radially outer rib end.

11. The fastener of claim 1, wherein the ribs change in height along a length thereof.

12. The fastener of claim 1, wherein the tapered point is self-drilling and includes a hole cutting edge.

13. The fastener of claim 1, wherein a tool engagement recess is located in the head.

* * * * *